(12) United States Patent
Affentranger, Jr. et al.

(10) Patent No.: US 12,294,331 B2
(45) Date of Patent: *May 6, 2025

(54) MOUNT ASSEMBLIES WITH CHEMICAL FLASHINGS

(71) Applicant: Sunrun Inc., San Francisco, CA (US)

(72) Inventors: Martin John Affentranger, Jr., Paso Robles, CA (US); William Stanley Arbuckle, Paso Robles, CA (US); Brian David Peterson, Santa Cruz, CA (US); Daniel Edward Ryan, Scotts Valley, CA (US)

(73) Assignee: Sunrun Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,508

(22) Filed: Nov. 7, 2023

(65) Prior Publication Data

US 2024/0186936 A1 Jun. 6, 2024

Related U.S. Application Data

(63) Continuation of application No. 17/481,816, filed on Sep. 22, 2021, now Pat. No. 11,848,637, which is a
(Continued)

(51) Int. Cl.
*H02S 20/23* (2014.01)
*F16J 15/10* (2006.01)
(Continued)

(52) U.S. Cl.
CPC ............. *H02S 20/23* (2014.12); *F16J 15/104* (2013.01); *F24S 25/00* (2018.05); *F24S 25/30* (2018.05); *H02S 30/10* (2014.12); *F24S 2025/015* (2018.05); *F24S 2025/021* (2018.05); *F24S 2025/6003* (2018.05); *F24S 25/61* (2018.05);
(Continued)

(58) Field of Classification Search
CPC ......... F16J 15/104; F24S 25/00; F24S 25/61; F24S 2025/021; H02S 20/23; H02S 30/10; Y02B 10/10; Y02B 10/20; Y02E 10/47
See application file for complete search history.

(56) References Cited

U.S. PATENT DOCUMENTS 6,536,729 B1 *  3/2003  Haddock ................. E04D 3/362
                                                       52/204.55
8,549,793 B1 * 10/2013  Gens ....................... F24S 25/61
                                                       52/302.6
(Continued)

*Primary Examiner* — Jessie T Fonseca
(74) *Attorney, Agent, or Firm* — Kramer Levin Naftalis & Frankel LLP

(57) ABSTRACT

Chemical flashings for track assemblies and mount assemblies employed in solar power installations are disclosed. In some embodiments, a track assembly having a base, a pair of rails, a sealant receiving cavity and a round groove extending into the base from the bottom of the base, and a compressible round seal disposed within the base extending past the bottom is disclosed. In some embodiments, a mount assembly having a vertical structure, a sealant receiving cavity and a round groove extending into the base from the bottom of the base, a compressible round seal disposed within the base extending past the bottom, and an excess sealant cavity is disclosed.

24 Claims, 19 Drawing Sheets

Related U.S. Application Data continuation of application No. 16/994,360, filed on Aug. 14, 2020, now Pat. No. 11,152,889.

(60) Provisional application No. 62/988,677, filed on Mar. 12, 2020.

(51) Int. Cl.
*F24S 25/00* (2018.01)
*F24S 25/30* (2018.01)
*H02S 30/10* (2014.01)
*F24S 25/60* (2018.01)
*F24S 25/61* (2018.01)

(52) U.S. Cl.
CPC ......... *F24S 2025/804* (2018.05); *Y02B 10/10* (2013.01); *Y02B 10/20* (2013.01); *Y02E 10/47* (2013.01)

(56) References Cited

U.S. PATENT DOCUMENTS

| | | | | |
|---|---|---|---|---|
| 8,631,629 B1* | 1/2014 | Wiener | ............... | E04D 13/1476 52/173.3 |
| 8,938,932 B1* | 1/2015 | Wentworth | ............. | H02S 20/23 52/173.3 |
| 10,320,325 B1* | 6/2019 | Atia | ........ | H02S 30/10 |
| 10,767,684 B1* | 9/2020 | Meine | .................. | F16B 33/004 |
| 11,486,134 B2 | 11/2022 | Meine | | |
| 11,572,690 B2 | 2/2023 | Meine | | |
| 2010/0307074 A1* | 12/2010 | Stearns | .................. | H02S 20/23 52/173.1 |
| 2011/0120047 A1* | 5/2011 | Stearns | .................. | E04D 13/04 52/698 |
| 2011/0179727 A1* | 7/2011 | Liu | ........ | F24S 25/61 52/173.3 |
| 2011/0227298 A1* | 9/2011 | Teng | ........ | E04B 1/66 277/645 |
| 2011/0247295 A1* | 10/2011 | Stearns | ..................... | E04B 1/66 248/237 |
| 2013/0074441 A1* | 3/2013 | Stearns | .................. | E04D 13/10 52/705 |
| 2013/0133270 A1* | 5/2013 | West | ....................... | F24S 25/61 52/705 |
| 2014/0175244 A1* | 6/2014 | West | ....................... | F24S 25/70 52/555 |
| 2014/0208664 A1* | 7/2014 | Schaefer | .................. | E04C 3/06 52/705 |
| 2014/0208680 A1* | 7/2014 | Schaefer | ................ | F16B 9/056 248/237 |
| 2014/0223838 A1* | 8/2014 | West | .................... | F24S 25/615 52/60 |
| 2014/0305046 A1* | 10/2014 | Stearns | ..................... | E04D 3/38 52/704 |
| 2014/0331594 A1* | 11/2014 | Stearns | ................. | F16B 43/001 52/705 |
| 2015/0155823 A1* | 6/2015 | West | ..................... | F24S 25/613 248/346.04 |
| 2015/0330084 A1* | 11/2015 | Stearns | ................... | H02S 20/23 52/58 |
| 2015/0361668 A1* | 12/2015 | Stearns | .................. | E04D 13/00 52/698 |
| 2016/0248367 A1* | 8/2016 | Almy | ...................... | F24S 25/00 |
| 2016/0248368 A1* | 8/2016 | Seery | ..................... | F24S 25/61 |
| 2016/0248369 A1* | 8/2016 | Almy | ...................... | F24S 25/61 |
| 2016/0268957 A1* | 9/2016 | Liptak | ................... | E04D 12/002 |
| 2017/0107723 A1* | 4/2017 | Stearns | .................... | H02S 20/23 |
| 2018/0087558 A1* | 3/2018 | Feldmann | ............... | H02S 20/23 |
| 2018/0167022 A1* | 6/2018 | Meine | ..................... | F24S 25/61 |
| 2018/0167023 A1* | 6/2018 | Meine | ..................... | H02S 20/23 |
| 2018/0274238 A1* | 9/2018 | Aliabadi | ................ | E04D 13/00 |
| 2018/0347196 A1* | 12/2018 | Stearns | ..................... | E04D 1/30 |
| 2019/0081587 A1* | 3/2019 | Mayfield | ............... | F24S 25/636 |
| 2019/0093340 A1* | 3/2019 | Meine | .................. | F16B 33/004 |
| 2019/0106885 A1* | 4/2019 | Stearns | .................... | F24S 25/61 |
| 2019/0131917 A1* | 5/2019 | Tomolillo | ............. | F16B 5/0614 |
| 2019/0379320 A1* | 12/2019 | Wentworth | ............. | F24S 25/33 |
| 2020/0248457 A1* | 8/2020 | Shadwell | ................ | F16M 13/02 |
| 2020/0362565 A1* | 11/2020 | Stearns | ..................... | F24S 25/61 |

* cited by examiner

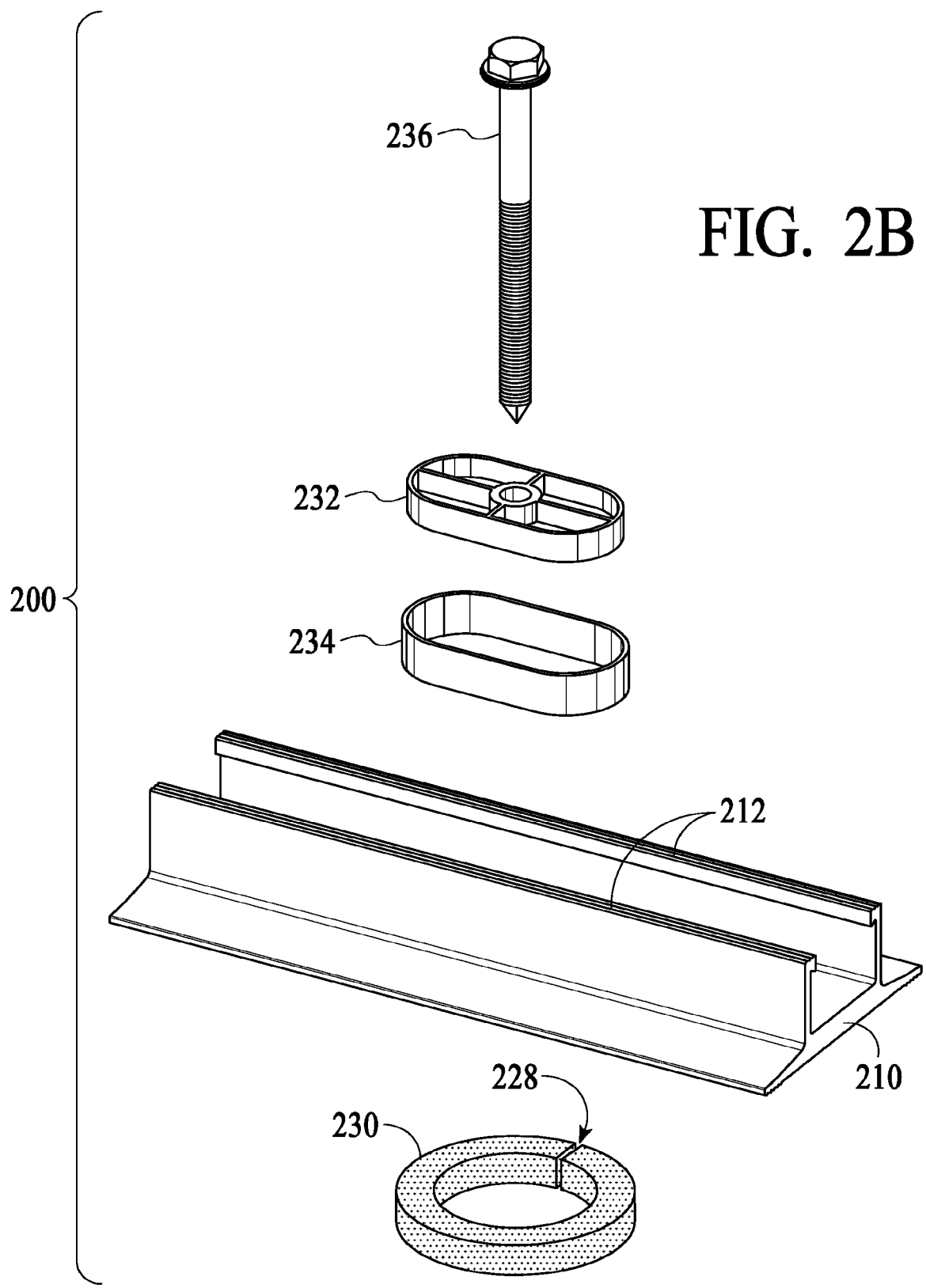

MOUNT ASSEMBLIES WITH CHEMICAL FLASHINGS

CROSS-REFERENCE TO RELATED APPLICATION

This application is a continuation of U.S. application Ser. No. 17/481,816 entitled "MOUNT ASSEMBLIES WITH CHEMICAL FLASHINGS," filed Sep. 22, 2021, which is now U.S. Pat. No. 11,848,637, which is a continuation of U.S. application Ser. No. 16/994,360 entitled "MOUNT ASSEMBLIES WITH CHEMICAL FLASHINGS," which is now U.S. Pat. No. 11,152,889, which claims the benefit of U.S. Provisional Patent Application Ser. No. 62/988,677, filed Mar. 12, 2020, which are hereby incorporated by reference in their entirety.

BACKGROUND

Building-mounted structures are typically secured to a building surface with one or more fastening devices. Such devices often penetrate the building surface in order to adequately secure the structure to the building. For example, solar power installations may be secured to rooftop structures by penetrating the roof surface with screws, bolts, or other types of fasteners suitable to perform the job. Adequately securing the solar power installation to the surface is critical to protect the panels and surrounding property. Penetrating the installation surface, however, can lead to various adverse issues including the ingress of moisture such as rain into the underlying structure supporting the surface installation.

SUMMARY

Embodiments of the inventive concepts disclosed herein are directed to track and mount attachment assemblies for solar power system installation on surfaces, such as, but not limited to, composition shingle roofs. Each attachment assembly employs sealing technology for surface penetration comprised of chemical flashing in place of mechanical flashing to create a weatherproof seal. Replacement of mechanical flashing with chemical flashing may improve installation times and the penetration seal.

In one aspect, embodiments of the inventive concepts disclosed herein are directed to a track assembly. The track assembly could include a base with a top surface and a bottom surface, a pair of rails extending away from the top surface until reaching distal ends with opposing flanges, a sealant-receiving cavity and a round groove extending upwardly into the base from the bottom surface, a compressible round seal with a circumferential pressure relief passageway and disposed within the round groove and extending downwardly beyond the bottom surface, and an aperture for facilitating a fastener during the installation of the track assembly to an installation surface. In some embodiments, sealant for creating the chemical flashing could be introduced to sealant-receiving cavity from a sealant gun, an inwardly busting seal filled with sealant, and/or blister pack disposed within the sealant-receiving cavity. In some embodiments, sealant could be forced into the sealant-receiving cavity by first introducing the sealant to a sealant chamber disposed between the pair of rails and extending away from the top surface. In some embodiments, sealant could be forced into the sealant-receiving cavity by first introducing sealant in a sealant cartridge and placed into a sealant cartridge receiver extending upwardly and angularly away from the top surface and the pair of rails.

In a further aspect, embodiments of the inventive concepts disclosed herein are directed to a mount assembly. The mount assembly could include a vertical structure separating forward and aft portions of a base and extending away from a top surface of the base, a sealant-receiving cavity and a round groove extending upwardly into the base from a bottom surface of the base, a compressible round seal with a circumferential pressure relief passageway and disposed within the round groove and extending downwardly beyond the bottom surface, an excess sealant cavity extending upwardly from the bottom surface and into the aft portion of the base, and an aperture for facilitating a fastener during the installation of the mount assembly to an installation surface.

In a further aspect, embodiments of the inventive concepts disclosed herein are directed to methods for creating chemical flashings for the preceding track and mount assemblies.

BRIEF DESCRIPTION OF THE DRAWINGS

For a fuller understanding of the inventive embodiments, reference is made to the following description taken in connection with the accompanying drawings in which:

FIGS. 2A-2E illustrate perspective views of a second track assembly, in accordance with some embodiments;

DETAILED DESCRIPTION

In the following description, several specific details are presented to provide a thorough understanding of embodiments of the inventive concepts disclosed herein. One skilled in the relevant art will recognize, however, that the inventive concepts disclosed herein can be practiced without one or more of the specific details or in combination with other components. In other instances, well-known implementations or operations are not shown or described in detail to avoid obscuring aspects of various embodiments of the inventive concepts disclosed herein.

Figure 1A:
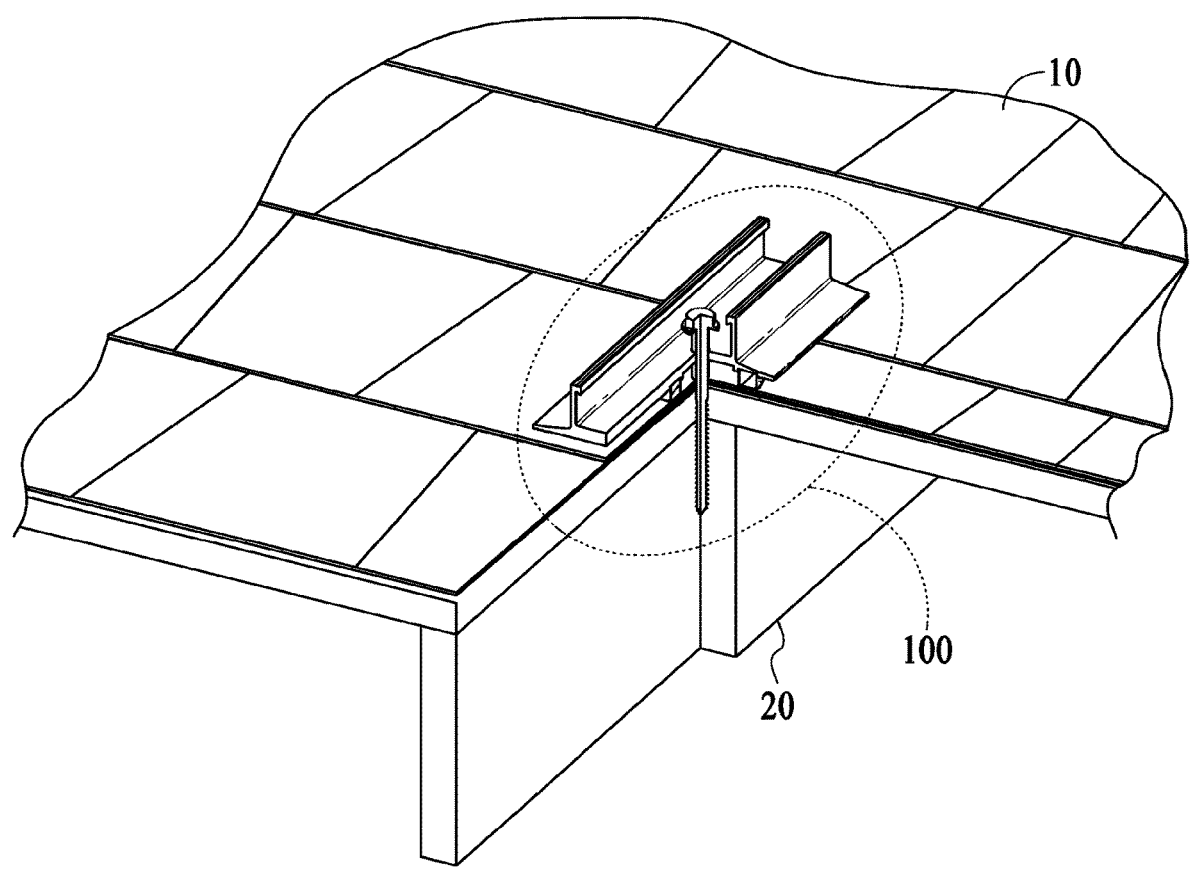
FIG. 1A illustrates a track assembly installed on a mounting or installation surface, in accordance with some embodiments.

FIG. 1A illustrates track assembly 100 installed or mounted on installation surface 10 such as a roof and underlying support structure 20 employing sealing technology for surface penetration comprised of chemical flashing as discussed in detail below.

Figure 1B:
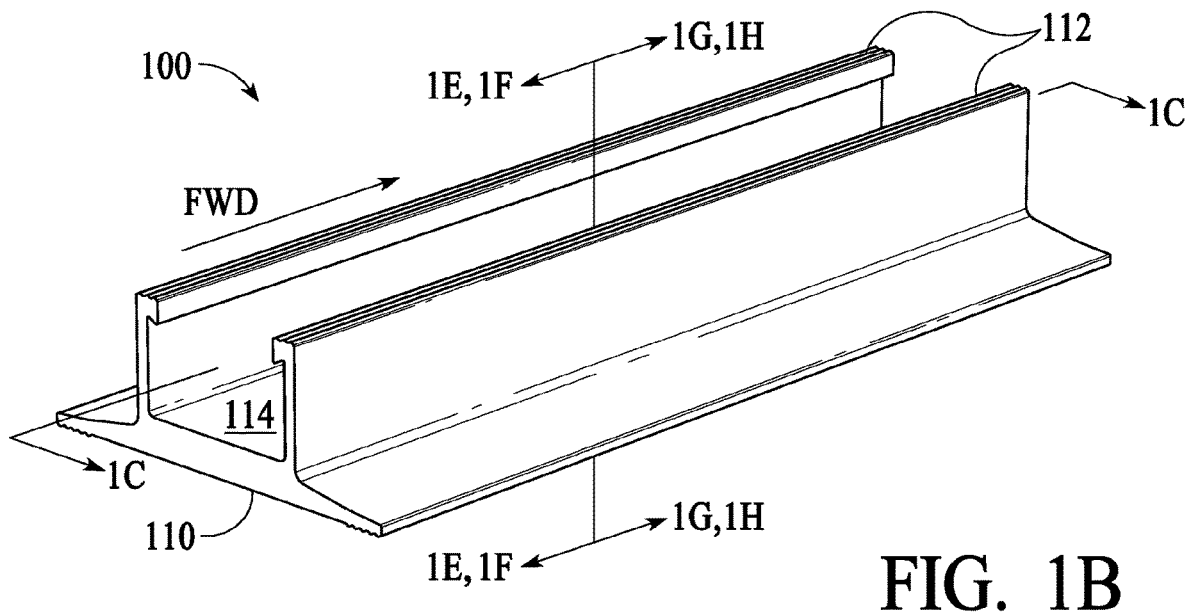
FIGS. 1B-1C illustrate top and bottom perspective views, respectively, of the track assembly, in accordance with some embodiments.
Figure 1C:
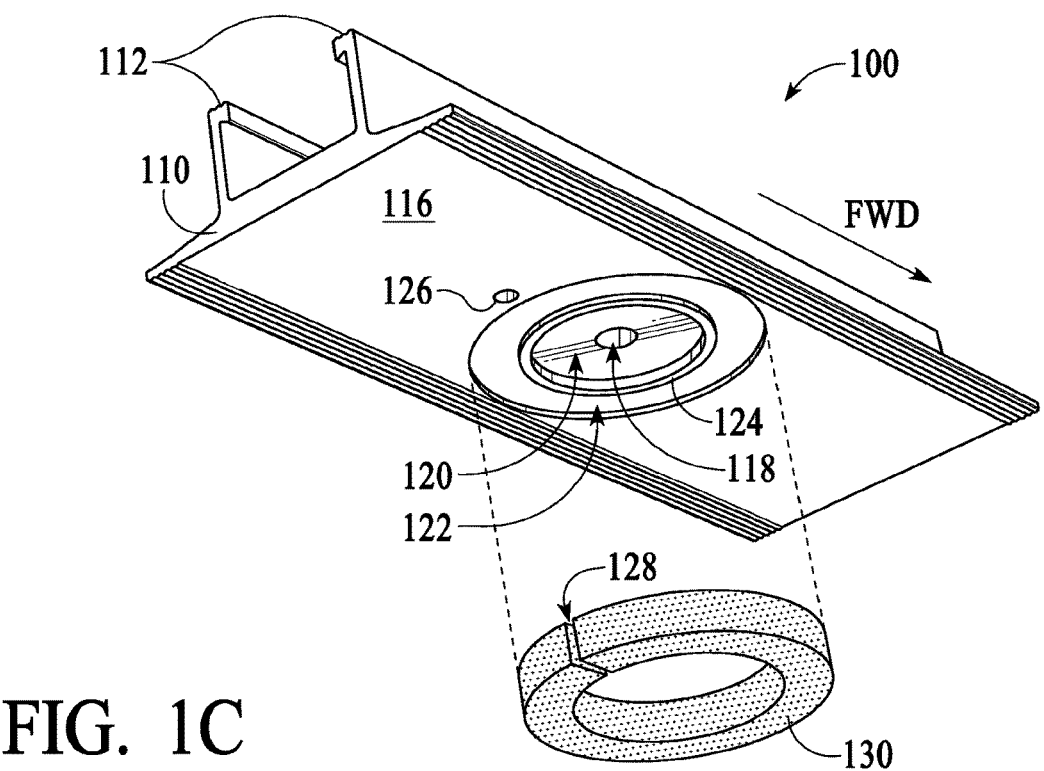
Figure 1D:
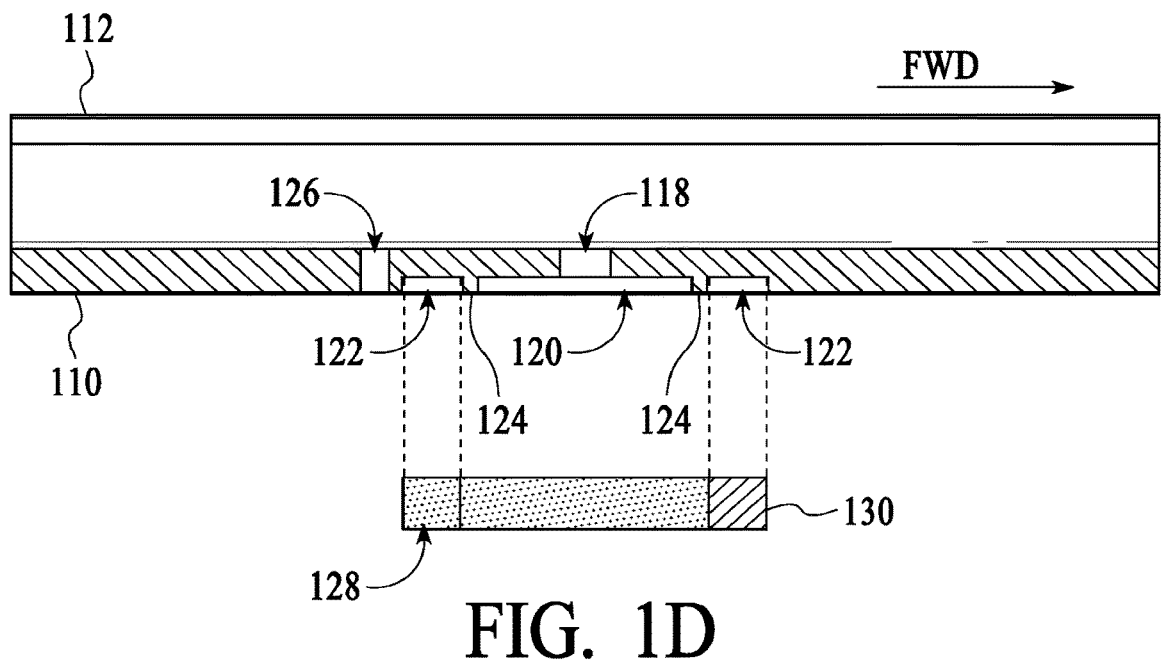
FIG. 1D illustrates a front, cross-sectional view of the track assembly, in accordance with some embodiments.
Figure 1E:
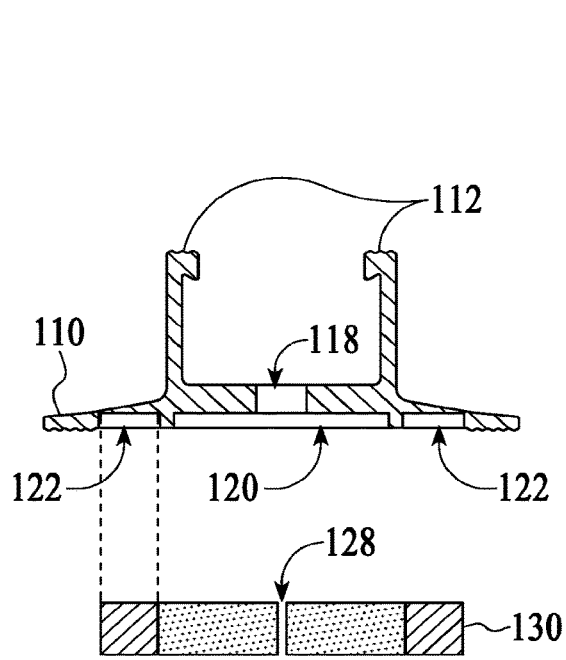
FIGS. 1E-1H illustrate side, cross-sectional views of the track assembly, in accordance with some embodiments.
Figure 1F:
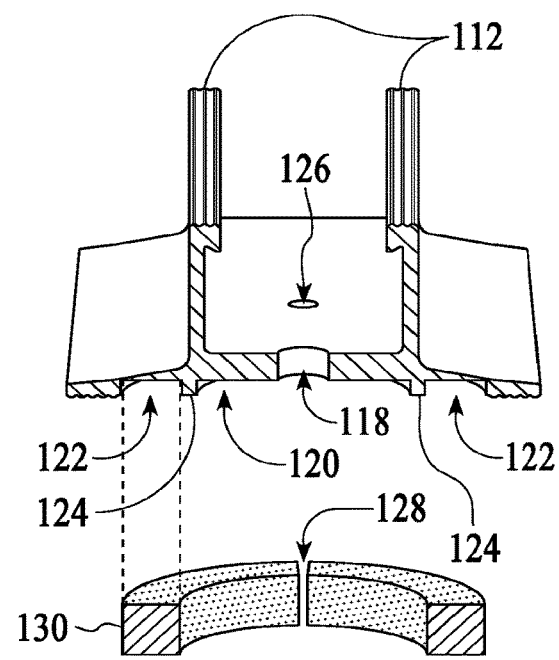
Figure 1G:
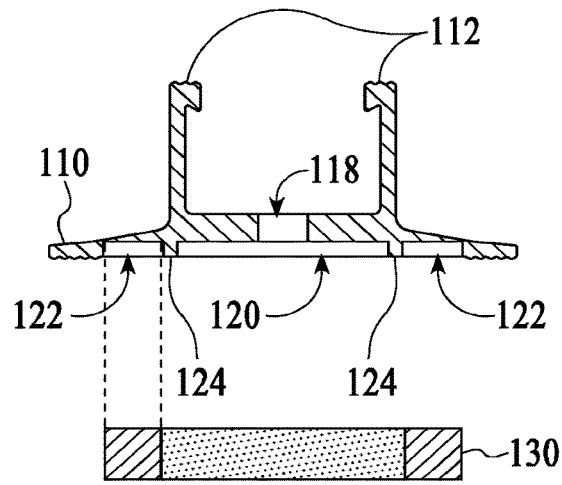
Figure 1H:
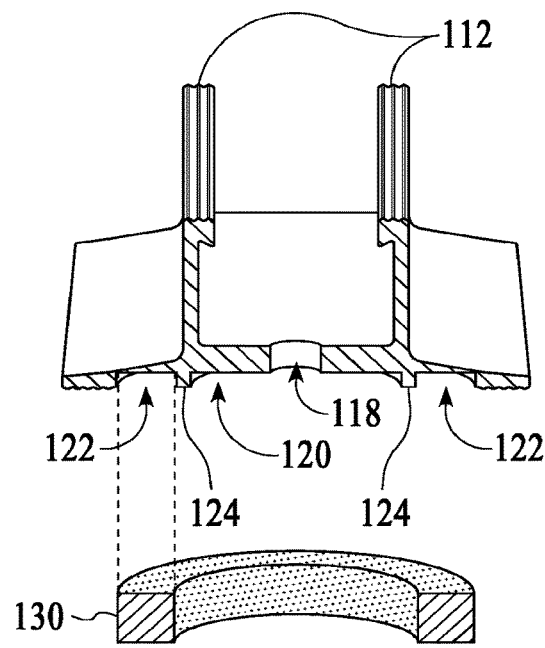
Figure 1I:
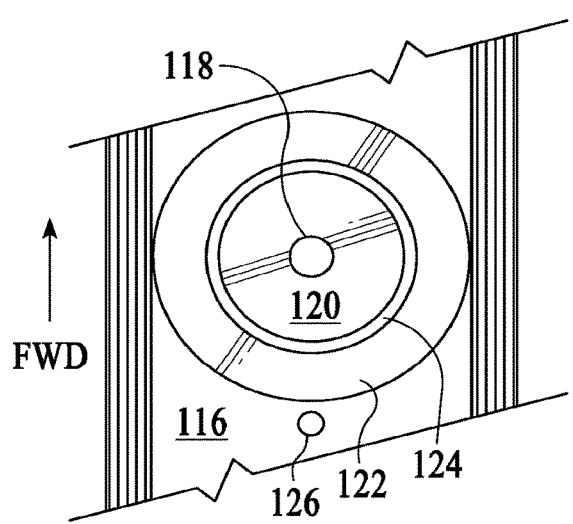
FIGS. 1I-1J illustrate bottom views of the track assembly, in accordance with some embodiments.
Figure 1J:
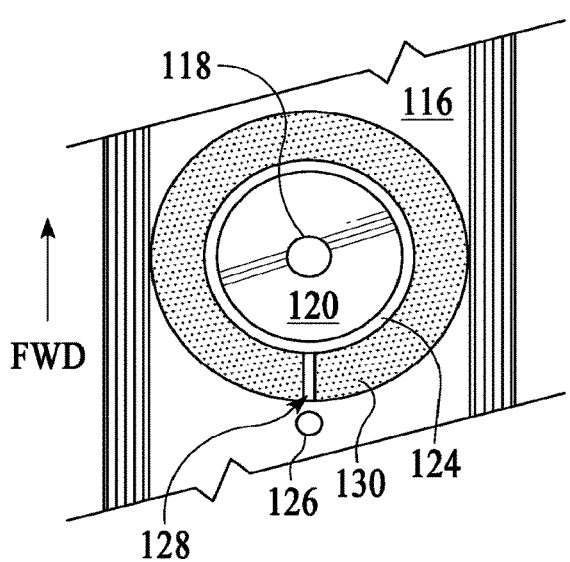
Figure 1K:
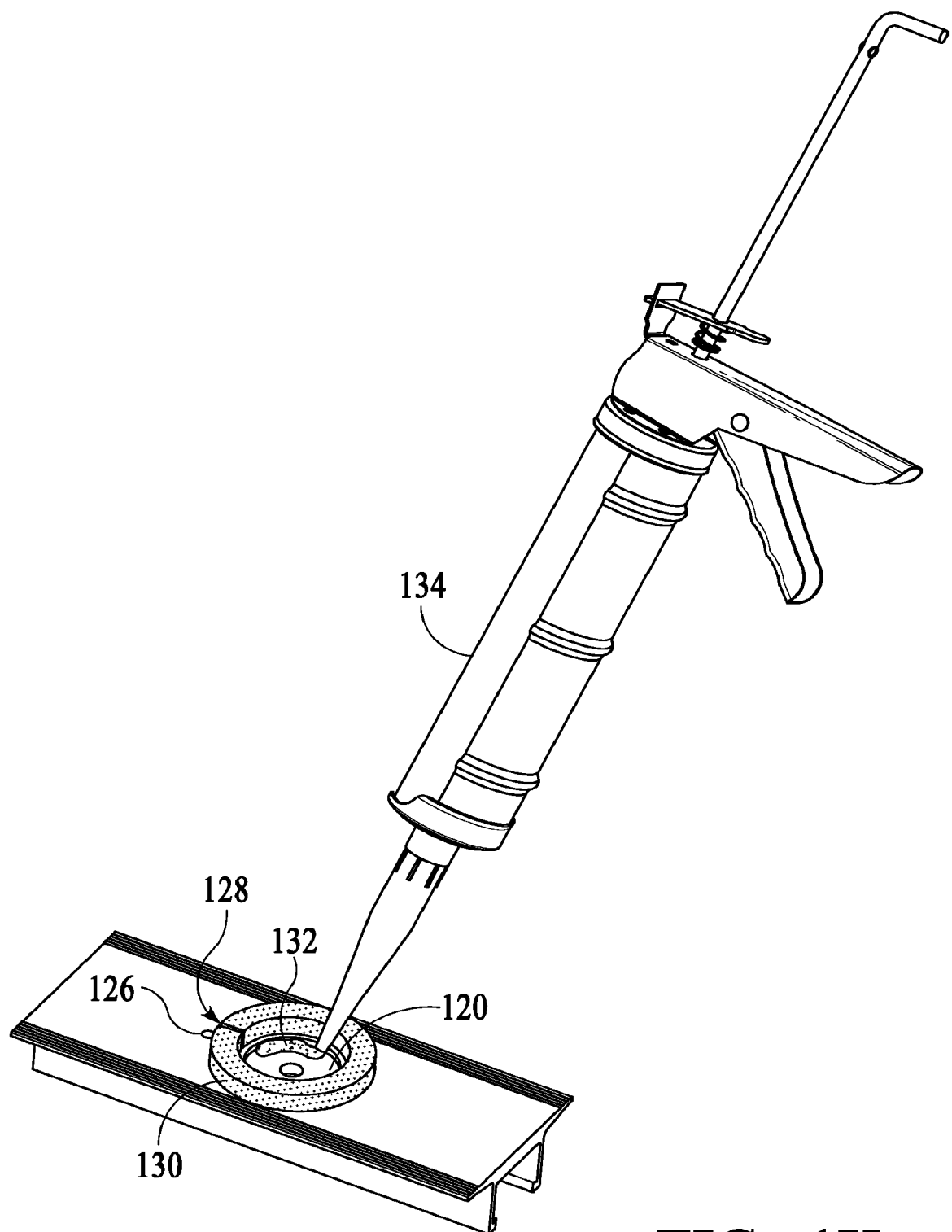
FIG. 1K illustrates an application of sealant to the track assembly by a sealant gun, in accordance with some embodiments.
Figure 1L:
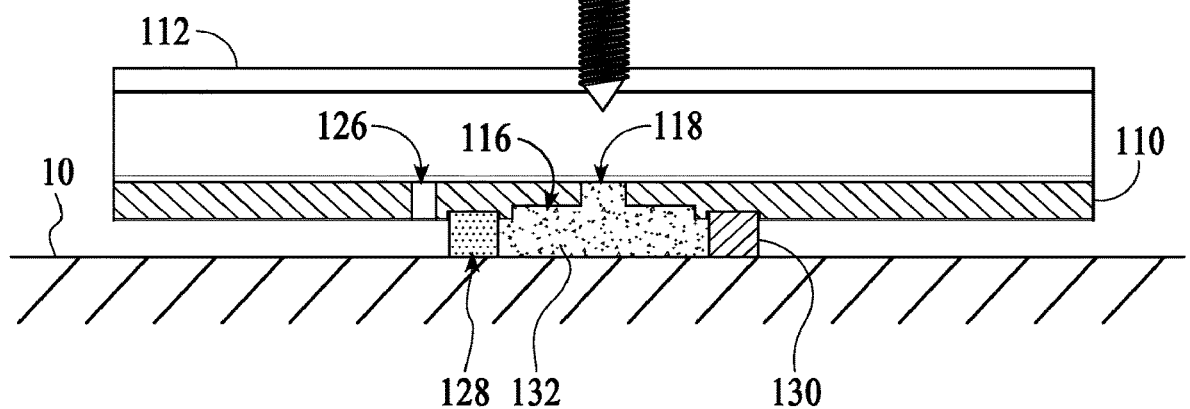
FIGS. 1L-1M illustrate side, cross-sectional views of the track assembly, in accordance with some embodiments.
Figure 1M:
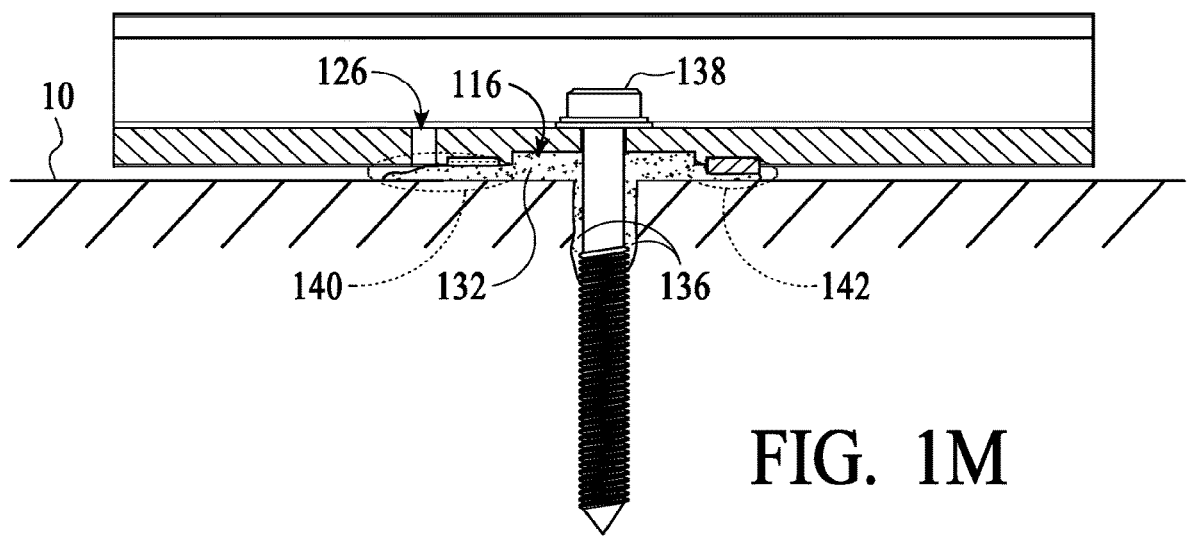
Figure 2A:
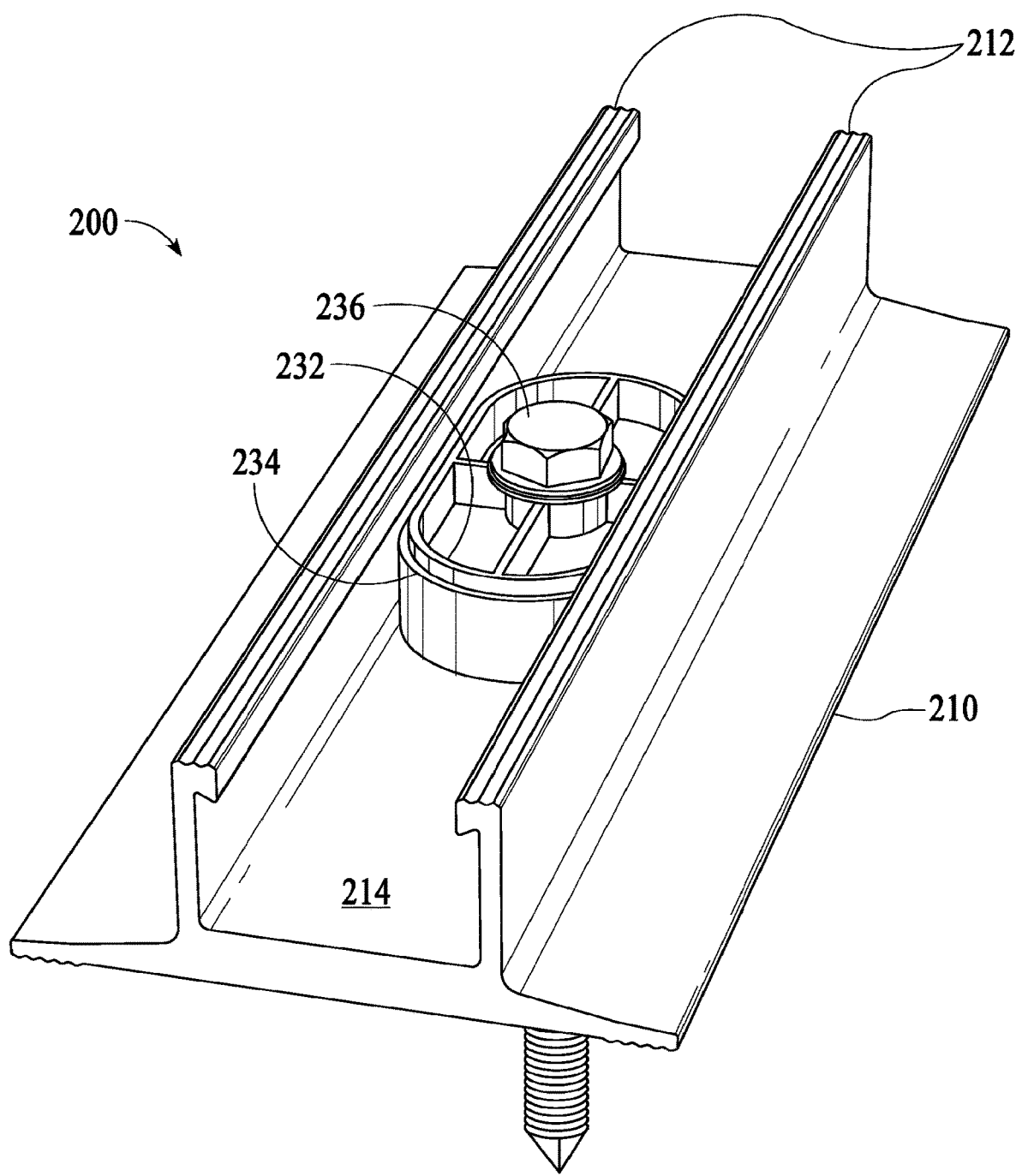
Figure 2C:
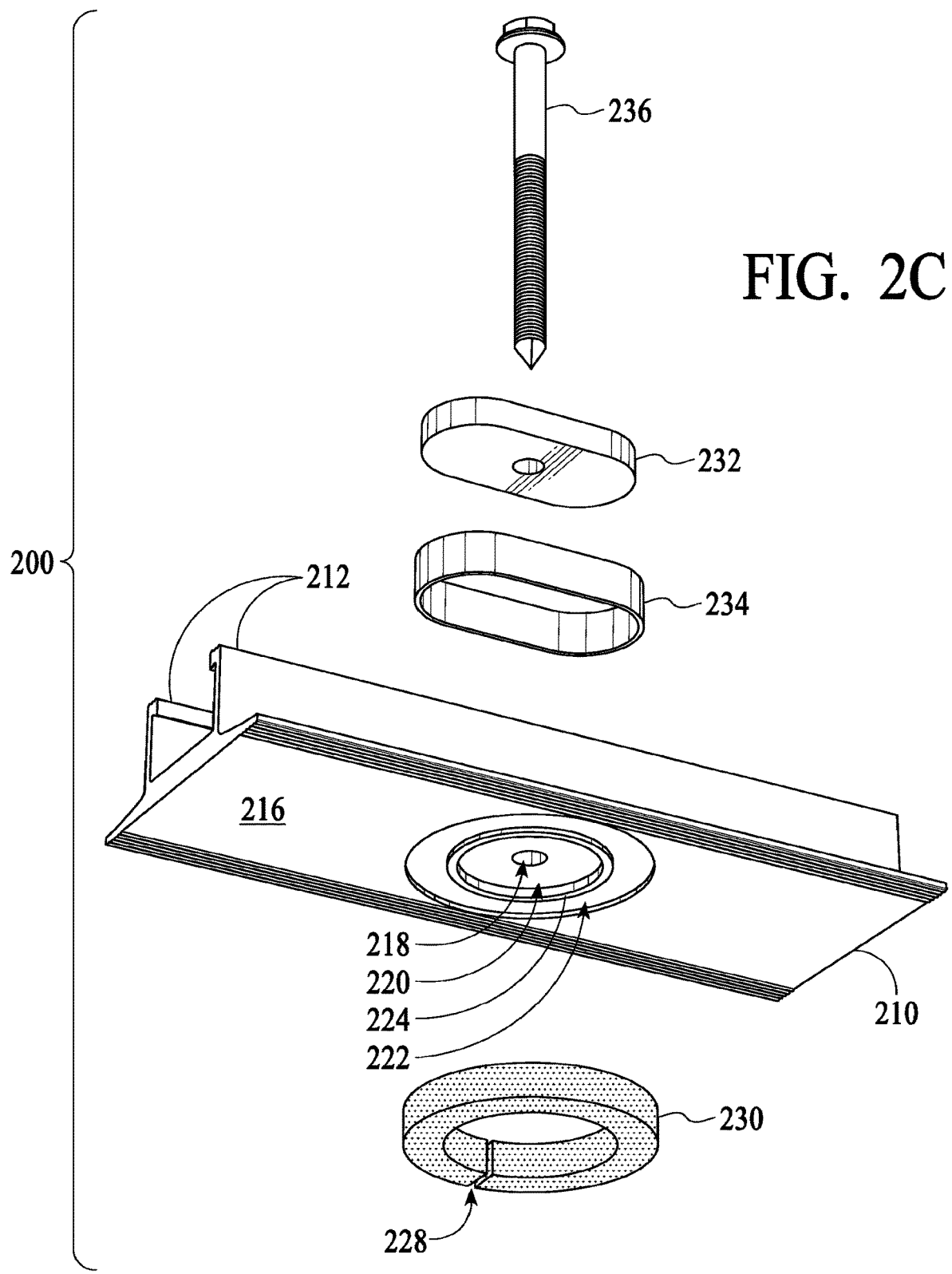
Figure 2D:
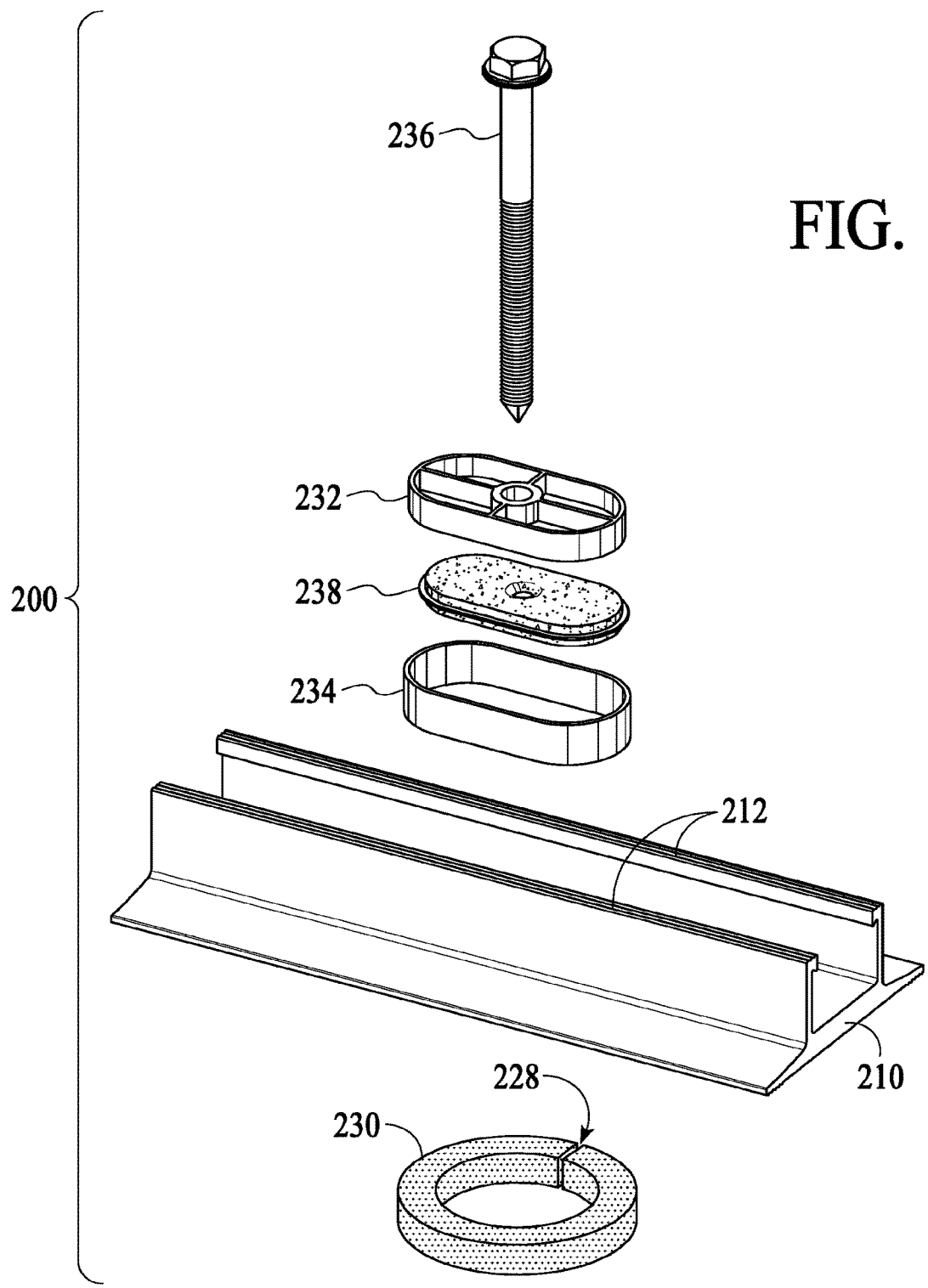
Figure 2E:
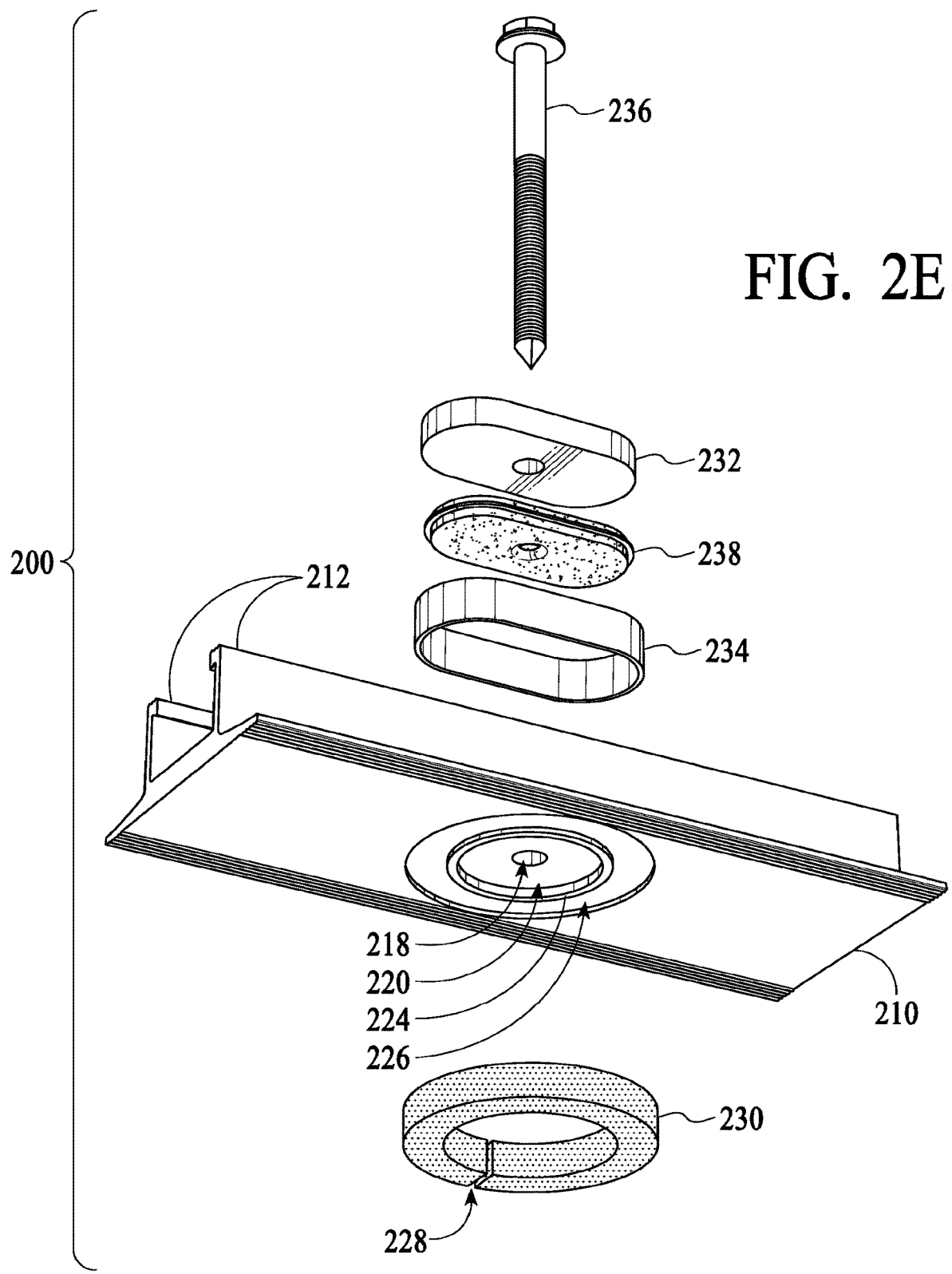

FIGS. 1B though 1M, inclusive, illustrate multiple orientations of track assembly 100 which may be employed when mounting solar photovoltaic (PV) modules to a mounting structure such as, for example, a roof. FIGS. 1B-1C illustrate top and bottom perspective views, respectively; FIGS. 1D-1H illustrate cross-sectional side views; FIGS. 1I-1J illustrate bottom views; FIG. 1K illustrates an application of sealant used in the creation of chemical flashing; and FIGS. 1L-1M illustrate cross-sectional side views of the creation of chemical flashing.

Track assembly 100 includes base 110 with a pair of vertical rails 112 extending approximately parallel to each other and perpendicularly away from top surface 114 of base 110. Bottom surface 116 of base 110 includes aperture 118, a sealant cavity 120 extending upwardly into base 110, and a seal groove 122 (e.g., round or circular) surrounding or encompassing sealant cavity 120 and extending upwardly into base 110; although the discussion herein will be drawn to seal groove 122 and seal 130 having round or circular shapes, the embodiments herein are not limited to such shapes but could include any shape which performs the same or equivalent functions as disclosed below. In some embodiments, sealant cavity 120 and seal groove 122 may be separated by round ridge 124, the bottom of which could lie in the same plane as bottom surface 116. In some embodiments, a sight hole 126 may be employed to provide a visual indicator of a proper seal and/or the creation of a chemical flashing as sealant is forcibly expelled through pressure-relief gap 128 along the circumference of round seal 130. Aperture 118 may be an opening extending between top surface 114 and bottom surface 116 through which mounting fastener 138 such as a lag screw travels to penetrate the underlying support structure 20 to secure track assembly 100 to installation surface 10. Although the discussion herein will be drawn to track and mount assemblies configured with one aperture through which one mounting fastener travels, other assemblies could be configured to be mounted with more than one fastener, each travelling through a separate aperture.

Sealant cavity 120 is configured for receiving sealant 132 prior to track assembly 100 being placed to installation position. Sealant cavity 120 serves as a pressurization vessel, and a sealant gun 134 may be used for the application or placement of sealant 132 both inside and outside of sealant cavity 120 and within seal 130 affixed to seal groove 122. Seal 130 provides a "damming" function, and pressure-relief passageway 128 is a channel through which pressured sealant 132 is forcibly expulsed or expelled as maximum back pressure is reached during the installation of track assembly 100. As seal 130 is compressed and pressure builds, passageway 128 closes until enough pressure is built up to where sealant can be expulsed or expelled because passageway 128 is weaker than other areas of seal 130. Also, pressured sealant 132 is forcibly sandwiched in between seal 130 and installation surface 10, filling in small voids that could be present due to an uneven, unsmooth, and/or rough texture of installation surface 10, thereby creating a circumferential chemical flashing about seal 130.

As embodied herein, the production of chemical flashing could include an application or placement of sealant 132 to sealant cavity 120 using sealant gun 134 until filled. Track assembly 100 may then be placed into position for installation so that seal 130 is placed against installation surface 10, and fastener 138 may be inserted into aperture 118. As fastener 138 penetrates underlying support structure 20, seal 130 is compressed, resulting in a buildup of pressurization applied to sealant 132 within sealant cavity 120 and constrained by seal 130. Pressurized sealant 136 is forced to travel into the hole formed by penetrating fastener 138. As seal 130 is compressed and pressure builds, passageway 128 closes until enough pressure is built up to where sealant can be expulsed or expelled because passageway 128 is weaker than other areas of seal 130. Furthermore, sealant 132 is forcibly sandwiched in between seal 130 and installation surface 10 (shown as sealant 142), filling in small voids that could be present due to an uneven, unsmooth, and/or rough texture of installation surface 10 as well as seal 130, thereby creating a circumferential chemical flashing about seal 130. In some embodiments, sight hole 126 may provide to an installer a visual indication of a proper seal and/or the creation of a chemical flashing. In some embodiments, sight hole 126 could be placed within vertical rails 112 to provide an enclosure to maintain a clean/safe work area and prevent an installer's equipment such as safety ropes and tools are kept from contacting excess sealant.

Instead of sealant gun 134, sealant 132 may be provided to sealant cavity 120 by seal 130 filled with sealant and designed to burst inward upon compression in some embodiments. Track assembly 100 may be placed into position for installation, and as fastener 138 is tightened, seal 130 filled with sealant will burst, resulting in the sealant being inwardly dispersed. An example of seal 130 designed to produce an inwardly dispersion of sealant is disclosed as a washer in U.S. Patent Application No. 2018/0087558. As pressure builds, the sealant within sealant cavity 120 will be forced to travel along the hole formed by penetrating fastener 138. As seal 130 is compressed and pressure builds, passageway 128 closes until enough pressure is built up to where sealant can be expulsed or expelled (shown as sealant 140) because passageway 128 is weaker than other areas of seal 130. Furthermore, sealant 132 is forcibly sandwiched in between seal 130 and installation surface 10 (shown as sealant 142), filling in small voids that could be present due to an uneven, unsmooth, and/or rough texture of installation surface 10 as well as seal 130, thereby creating a circumferential chemical flashing about seal 130. In some embodiments, sight hole 126 may provide to an installer a visual indication of a proper seal and/or the creation of a chemical flashing.

In some embodiments, a blister pack may be placed into position for installation within sealant cavity 120 and, upon installation, pierced by fastener 138, allowing for the flow of sealant. As pressure builds, sealant 136 within sealant cavity 120 will be forced to travel along the hole formed by penetrating fastener 138. As seal 130 is compressed and pressure builds, passageway 128 closes until enough pressure is built up to where sealant can be expulsed or expelled because passageway 128 is weaker than other areas of seal 130. Furthermore, sealant 132 is forcibly sandwiched in between seal 130 and installation surface 10 (shown as sealant 142), filling in small voids that could be present due to an uneven, unsmooth, and/or rough texture of installation surface 10 as well as seal 130, thereby creating a circumferential chemical flashing about seal 130. In some embodiments, sight hole 126 may provide to an installer a visual indication of a proper seal and/or the creation of a chemical flashing.

FIGS. 2A-2E, inclusive, illustrate top and bottom perspective views of track assembly 200. Similar to track assembly 100, track assembly 200 includes base 210 with a pair of vertical rails 212 extending approximately parallel to each other and perpendicularly away from top surface 214 of base 210. Bottom surface 216 of base 210 includes aperture 218, a sealant cavity 220 extending upwardly into base 210, and seal groove 222 extending upwardly into base 210. In some embodiments, sealant cavity 220 and seal groove 222 may be separated by round ridge 224, the bottom of which could lie in the same plane as bottom surface 216. Aperture 218 may be an opening extending between top surface 214 and bottom surface 216 through which mounting fastener 238 such as a lag screw travels to penetrate the underlying support structure 20 to secure track assembly 200 to installation surface 10.

Sealant cavity 220 is configured for receiving sealant (not shown) as base 210 is secured to installation surface 10. With base 210 placed into position on installation surface 10 with seal 230 placed against installation surface 10, fastener 236 may be inserted through plunger 232 and blister pack 238. As fastener 236 is tightened, plunger 232 is driven downward into sealant chamber 234 to compress blister pack 238 until it bursts, at which time sealant flows into sealant cavity 220 through an aperture 218 of base 210. Upon further tightening, seal 230 is compressed, resulting in a buildup of pressurization applied to the sealant within sealant cavity 220 and constrained by seal 230. The pressurized sealant is forced to travel along the hole formed by penetrating fastener 238. As seal 230 is compressed and pressure builds, passageway 228 closes until enough pressure is built up to where sealant can be expulsed or expelled because passageway 228 is weaker than other areas of seal 230. Furthermore, the sealant is forcibly sandwiched in between seal 230 and installation surface 10, filling in small voids that could be present due to an uneven, unsmooth, and/or rough texture of surface 10 as well as seal 230, thereby creating a circumferential chemical flashing about seal 230. In some embodiments, a sight hole (not used in this configuration) may provide a visual indicator of a proper seal and/or the creation of a chemical flashing if pressure-relief passageway 228 is aligned to steer the sealant in the direction of the sight hole.

In some embodiments, sealant chamber 234 may be filled with sealant by a manufacturer and designed to burst upon an application of a compressive force, allowing for the flow of sealant while eliminating blister pack 238. In some embodiments, sealant chamber 234 may be pre-filled with sealant provided in blister pack 238 that is pierced by fastener 236, allowing for the flow of sealant. In some embodiments, sealant chamber 234 may be pre-filled with sealant provided by sealant gun 134, thereby eliminating blister pack 238.

Figure 3A:
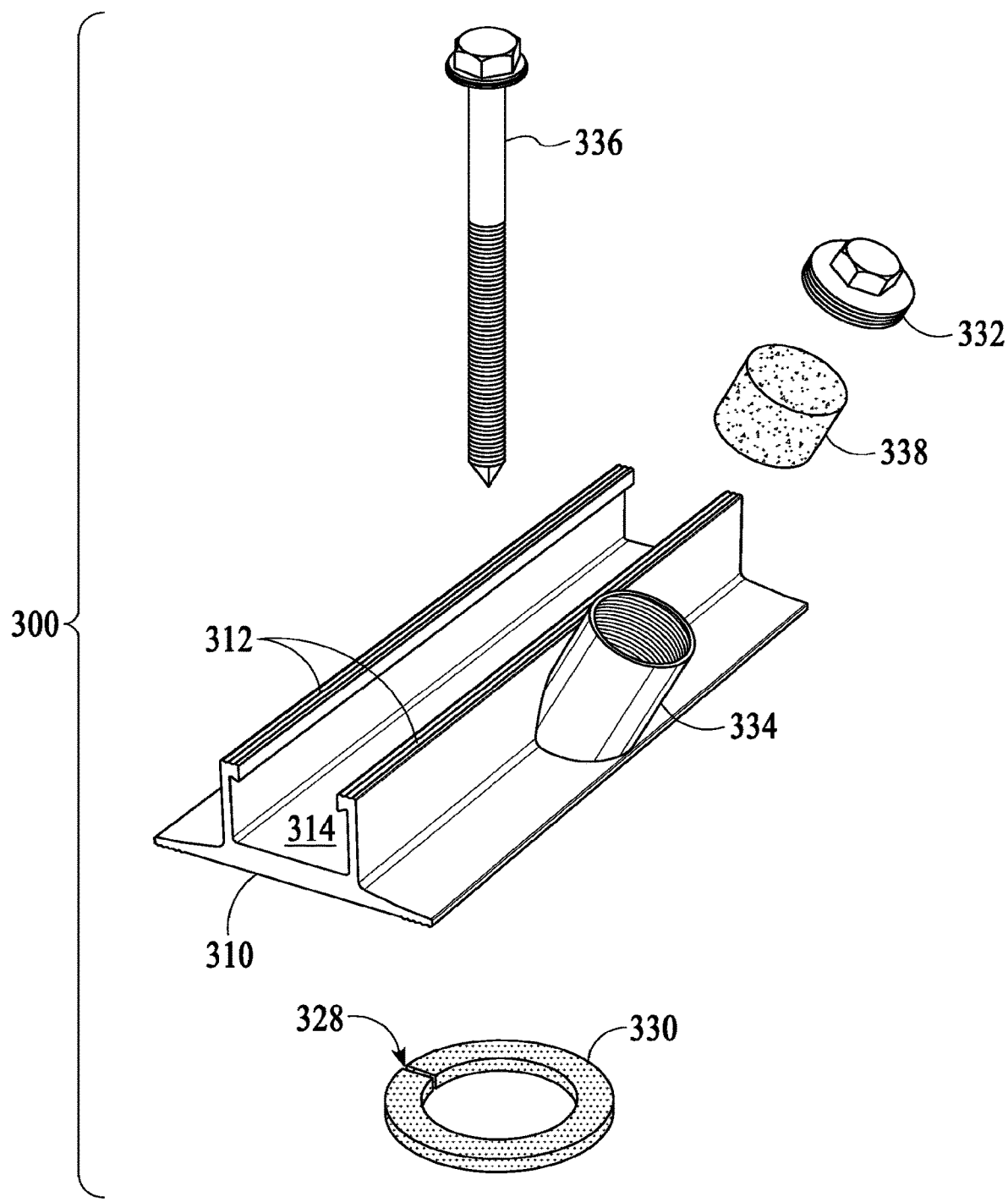
FIGS. 3A-3B illustrate perspective views of a third track assembly, in accordance with some embodiments.
Figure 3B:
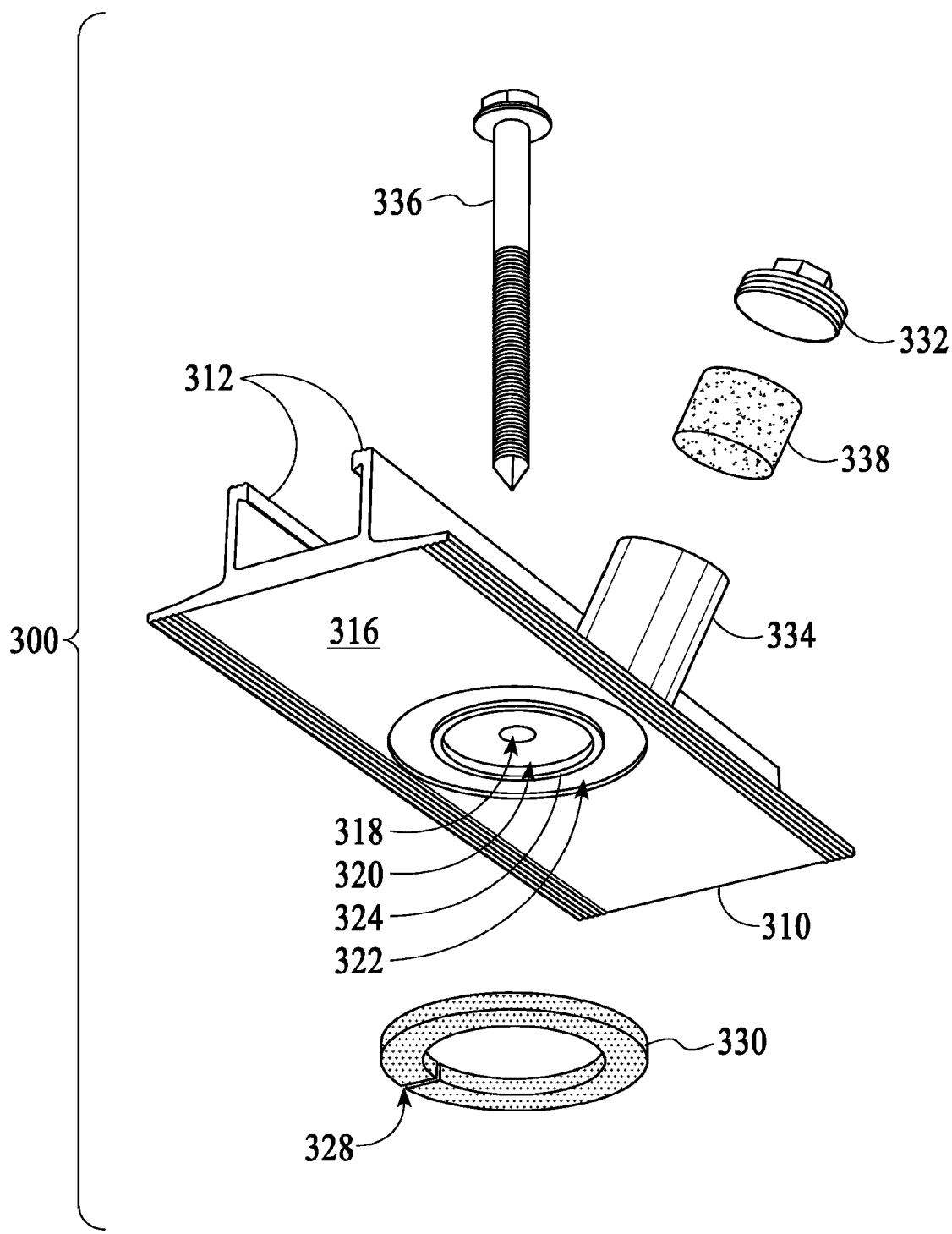
Figure 3C:
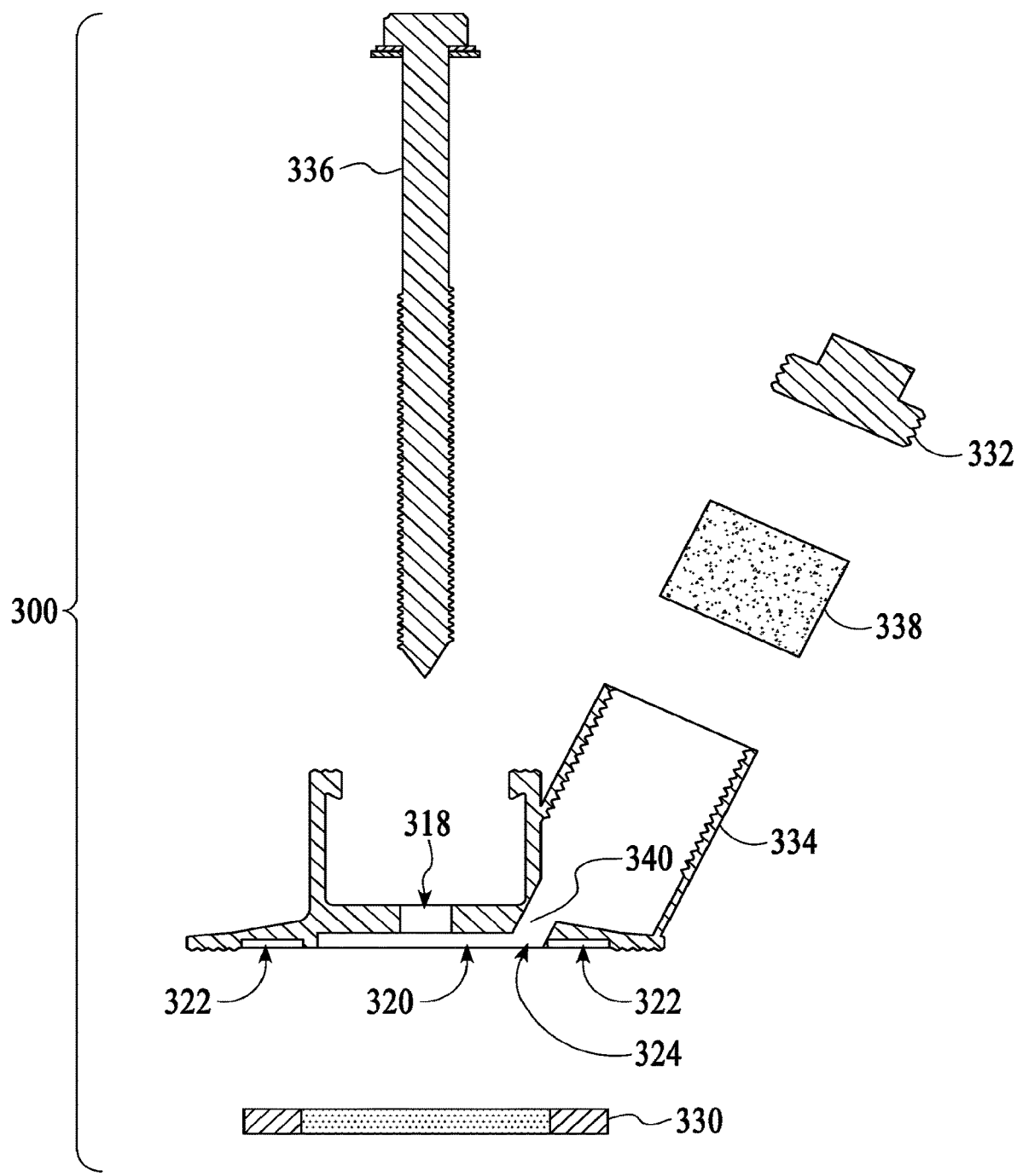
FIG. 3C illustrates a side, cross-sectional view of the third track assembly, in accordance with some embodiments.

FIGS. 3A-3B illustrate top and bottom perspective views of track assembly 300, and FIG. 3C illustrates a cross-sectional side view. Similar to track assemblies 100 and 200, track assembly 300 includes base 310 with a pair of vertical rails 312 extending approximately parallel to each other and perpendicularly away from top surface 314 of base 310. Bottom surface 316 of base 310 includes aperture 318, a sealant cavity 320 extending upwardly into base 310, and seal groove 322 extending upwardly into base 310. In some embodiments, sealant cavity 320 and seal groove 322 may be separated by round ridge 324, the bottom of which could lie in the same plane as bottom surface 316. Aperture 340 is an opening extending between sealant cavity 320 and threaded cartridge receiver 334. Aperture 318 is an opening extending between top surface 314 and bottom surface 316 through which mounting fastener 336 such as a lag screw travels to penetrate the underlying support structure 20 to secure track assembly 300 to installation surface 10.

In some embodiments, sealant cavity 320 is configured for receiving sealant stored in sealant cartridge 338 after seal 330 is compressed and base 310 is secured to installation surface 10 with fastener 336. With sealant cartridge 338 placed inside of cartridge receiver 334 and actuator 332 threadably engaged with threads of cartridge receiver 334, a tightening force is applied to actuator 332 to impart a compressive force on sealant cartridge 338, forcing the sealant from sealant cartridge 338 to empty into sealant chamber 320 through aperture 340, resulting in a buildup of pressurization applied to the sealant within sealant cavity 320 and constrained by seal 330. The pressurized sealant is forced to travel along the hole formed by penetrating fastener 336. Furthermore, the sealant is forcibly sandwiched in between seal 330 and installation surface 10, filling in small voids that could be present due to an uneven, unsmooth, and/or rough texture of surface 10 as well as seal 330, thereby creating a circumferential chemical flashing about seal 330. In some embodiments, a sight hole (not used in this configuration) may provide a visual indicator of a proper seal and/or the creation of a chemical flashing if pressure-relief passageway 328 is aligned to steer the sealant in the direction of the sight hole.

In some embodiments, sealant cavity 320 is configured for receiving sealant stored in sealant cartridge 338 prior to base 310 being secured to installation surface 10 through the use of actuator 332, cartridge receiver 334, and sealant cartridge 338. With base 320 placed into position on installation surface 10 with seal 330 placed against installation surface 10, sealant cartridge 338 is inserted into cartridge receiver 334, and actuator 332 is driven downward to impart a compressive force on cartridge receiver 334, forcing the sealant from sealant cartridge 338 and into sealant chamber 320 through aperture 340. As fastener 336 penetrates underlying support structure 20, seal 330 is compressed, resulting in a buildup of pressurization applied to the sealant within sealant cavity 320 and constrained by seal 330. The pressurized sealant is forced to travel along the hole formed by penetrating fastener 336. As seal 330 is compressed and pressure builds, passageway 328 closes until enough pressure is built up to where sealant can be expulsed or expelled because passageway 328 is weaker than other areas of seal 330. Furthermore, the sealant is forcibly sandwiched in between seal 330 and installation surface 10, filling in small voids that could be present due to an uneven, unsmooth, and/or rough texture of surface 10 as well as seal 330, thereby creating a circumferential chemical flashing about seal 330. In some embodiments, a sight hole (not used in this configuration) may provide a visual indicator of a proper seal and/or the creation of a chemical flashing if pressure-relief passageway 328 is aligned to steer the sealant in the direction of the sight hole.

It should be noted that, although the preceding discussion has been drawn towards track assemblies 100, 200, and 300 as illustrated, the embodiments disclosed herein are not limited to tracks having pairs of vertical rails. Taking track assembly 100 as an example, the embodiments disclosed herein may be applied to any mount assembly base 110 secured to an installation surface 10 that does not include vertical rails 112 but yet configured with a top surface 114 for supporting other configurations of mounting structure, a bottom surface 116, an aperture 118, a sealant cavity 120 extending upwardly into base 110, and a round seal groove 122 extending upwardly into base 110, where sealant cavity 120 and round seal groove 122 may be separated by round ridge 124, the bottom of which could lie in the same plane as bottom surface 116.

Figure 4A:
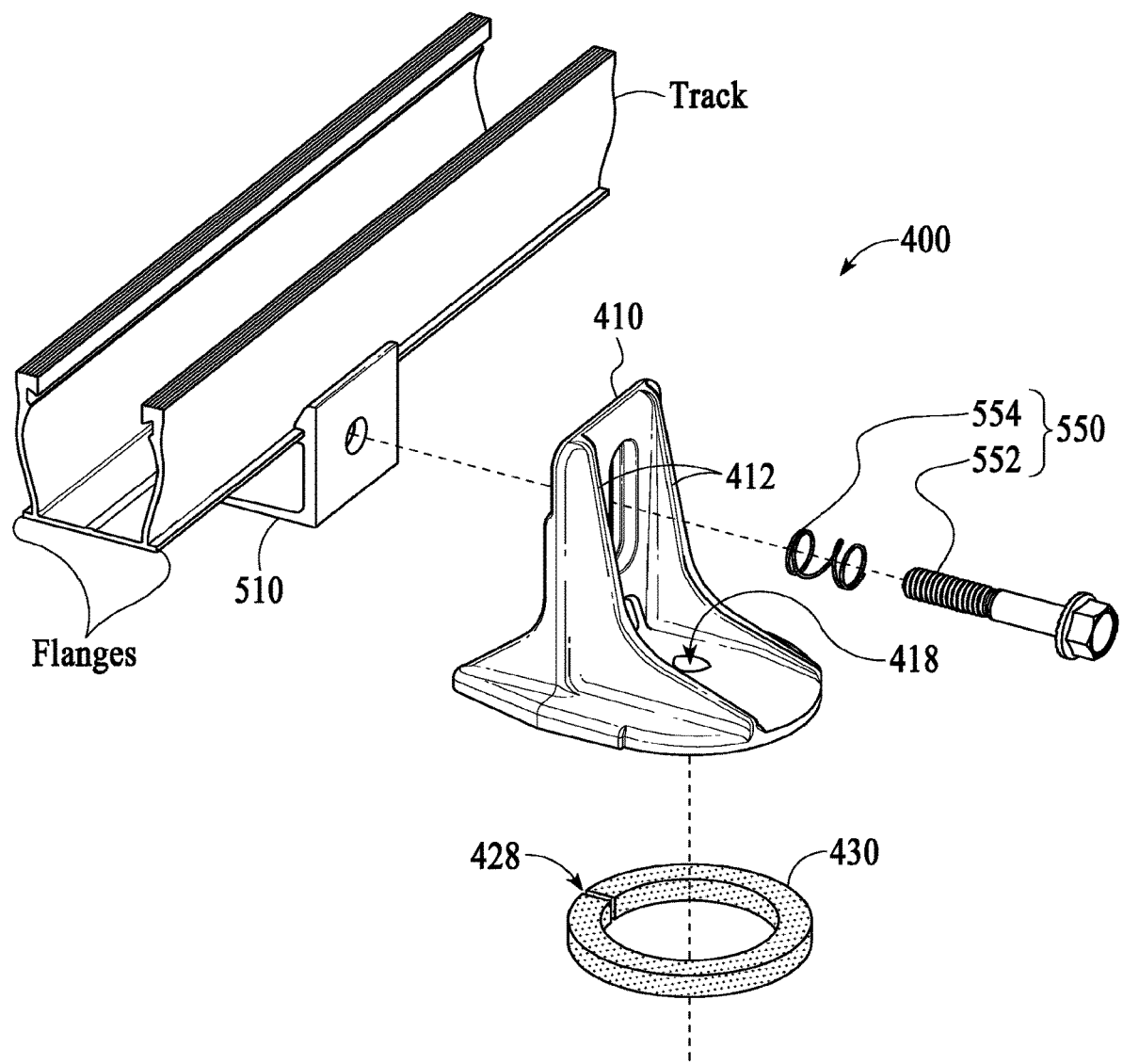
FIGS. 4A-4C illustrate perspective views of a mount assembly, in accordance with some embodiments.
Figure 4B:
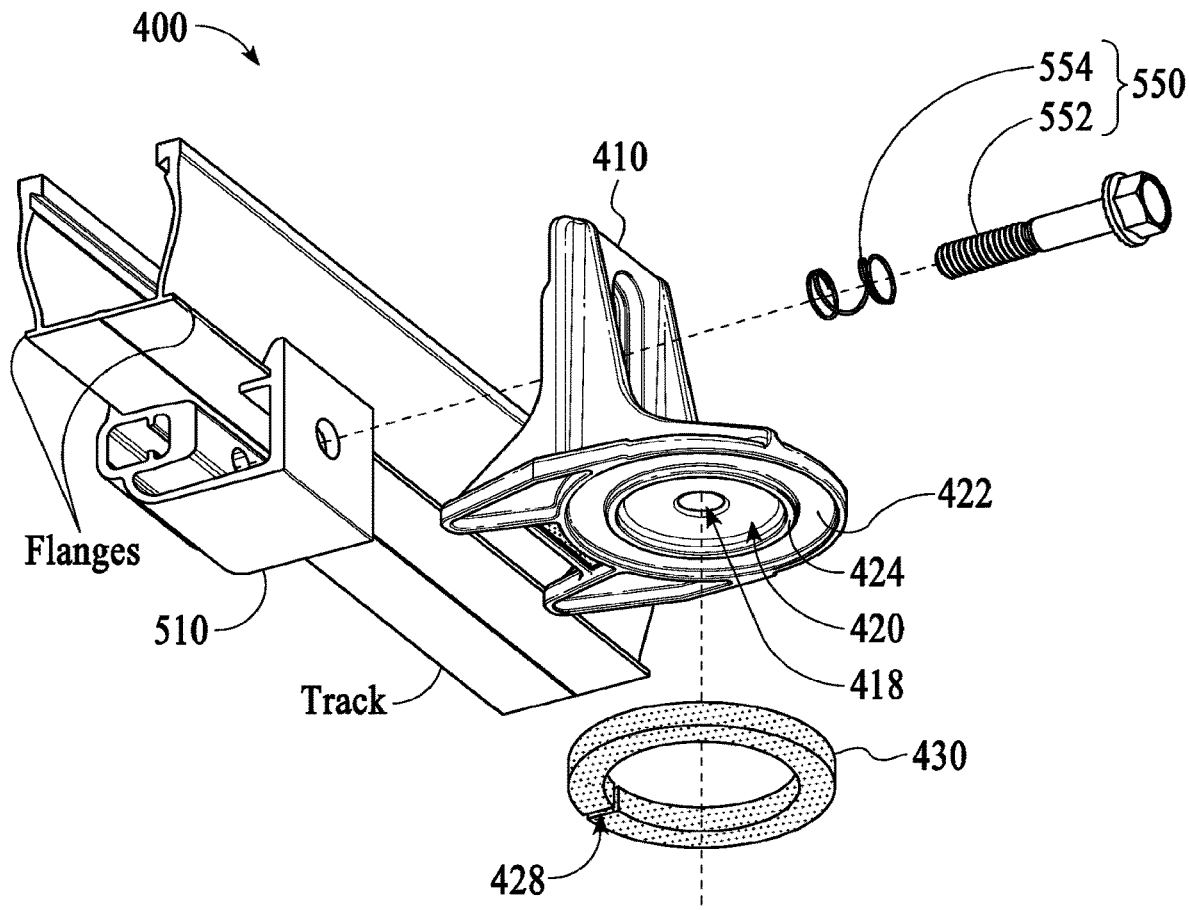
Figure 4C:
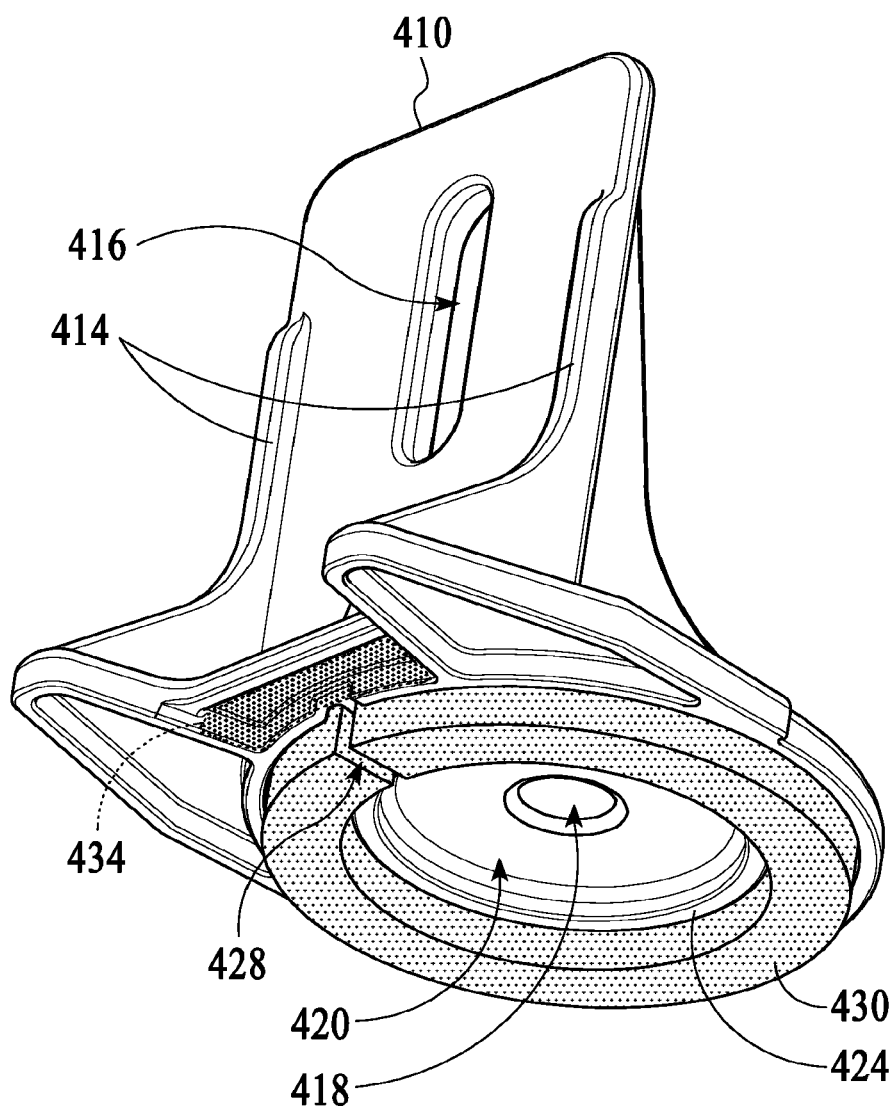
Figure 4D:
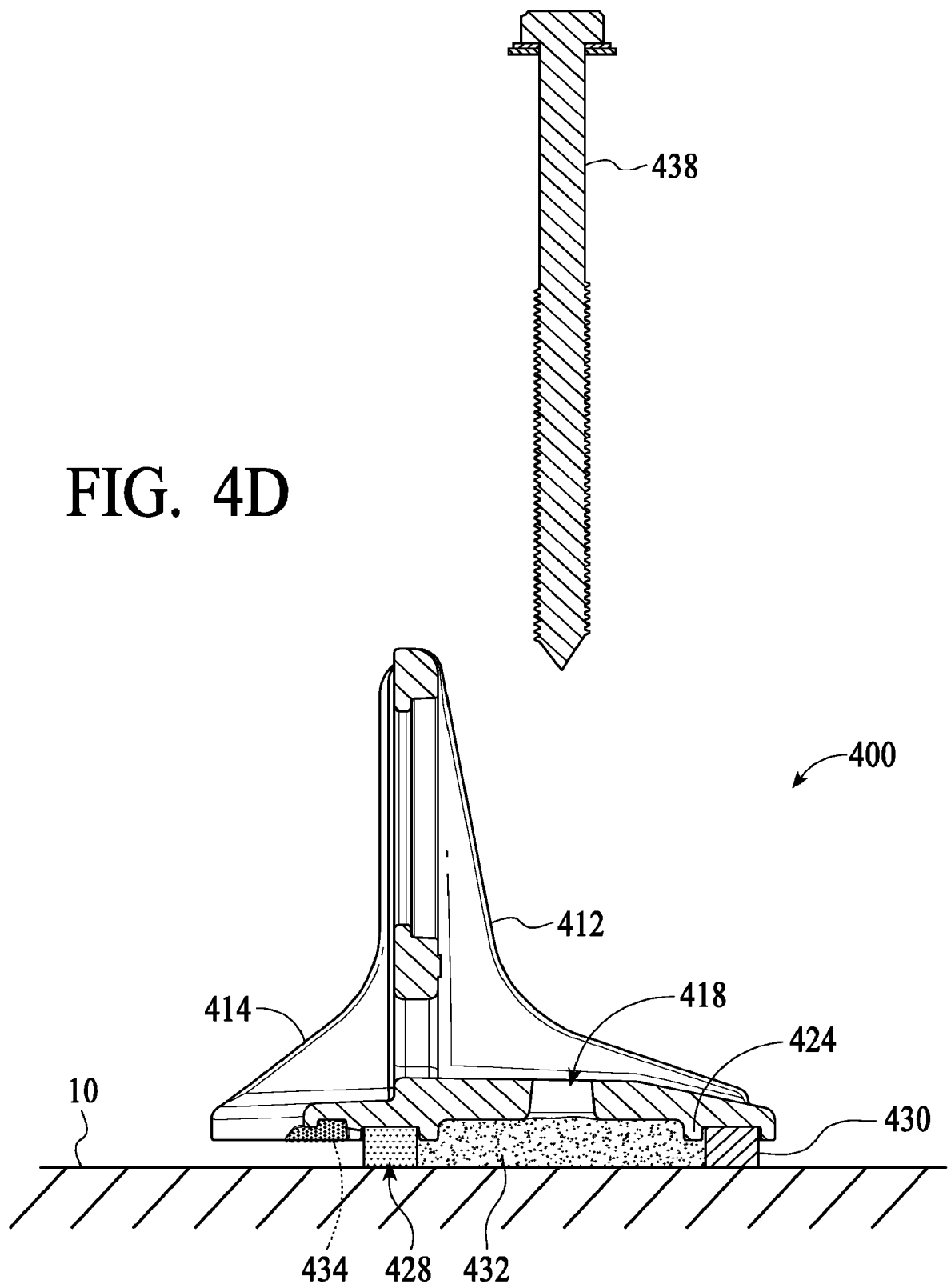
FIGS. 4D-4E illustrate side, cross-sectional views of the mount assembly, in accordance with some embodiments.
Figure 4E:
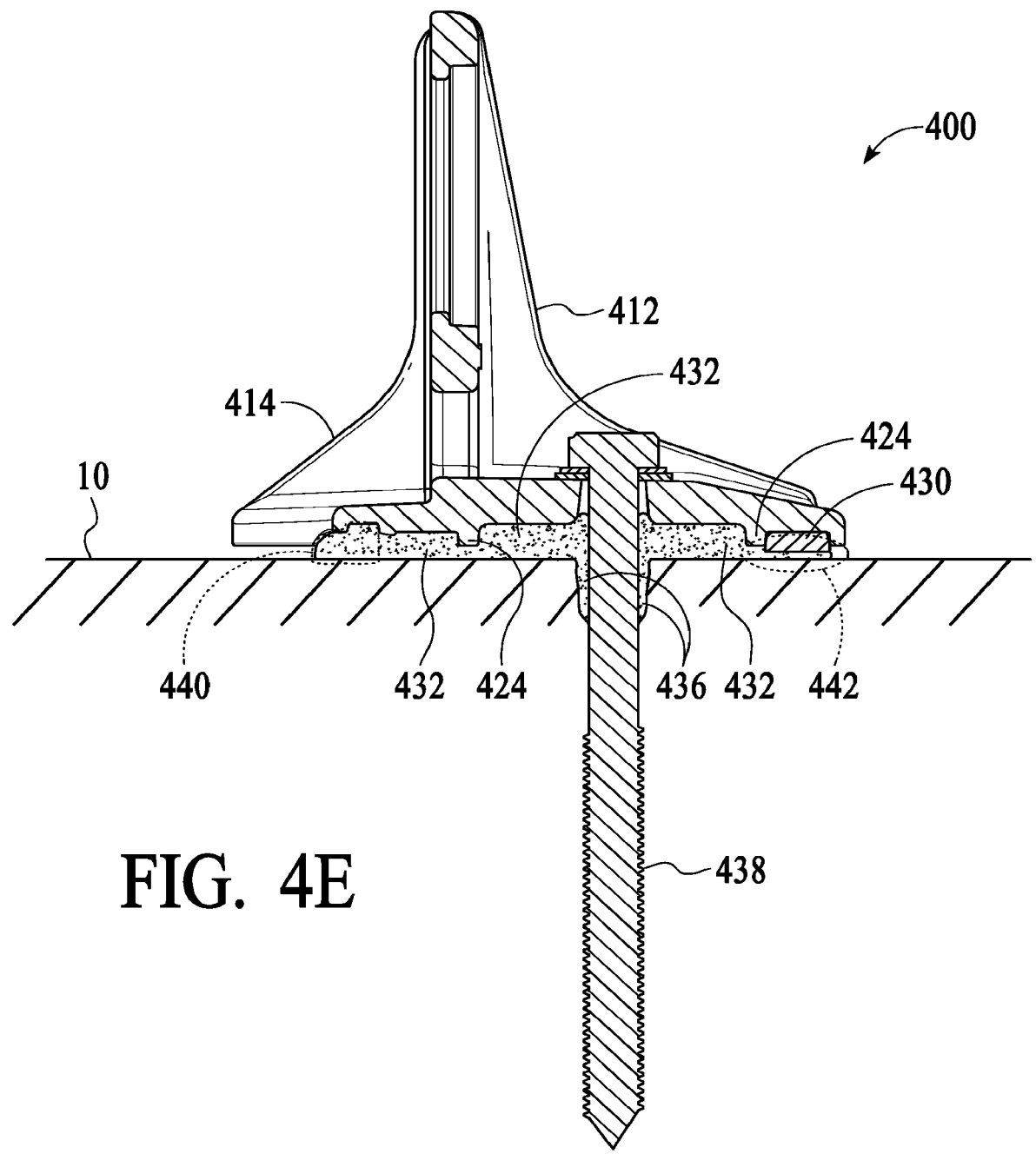

FIGS. 4A-4C illustrate top and bottom perspective views of mount assembly 400, and FIGS. 4D-4E illustrate cross-sectional side views. Mount assembly 400 includes vertical structure 410, a forward portion having a pair of forward vertical support legs 412 extending approximately parallel to each other and perpendicularly away from vertical structure 410, an aft portion having a pair of aft vertical support legs 414 extending approximately parallel to each other and perpendicularly away from vertical structure 410 as shown, and an elongated slot 416 in vertical structure 410.

Mount assembly 400 may be employed to provide a height-adjustable support for solar PV modules mounted above an installation surface 10. As shown for the purpose of illustration and not of limitation, fastener 550 may extend through elongated slot 416 and engage clamp 510 configured to secure track 520 (disclosed in U.S. Design Pat. No. D853,954) to mount assembly 400. The elongation of slot 416 enables the ability to adjust the height above installation surface 10 where the solar PV modules are mounted.

The bottom of mount assembly 400 includes aperture 418 extending vertically through the forward portion, sealant cavity 420 extending upwardly into mount assembly 400, and seal groove 422 extending upwardly into mount assembly 400. In some embodiments, sealant cavity 420 and round seal groove 422 may be separated by round ridge 424. The bottom of mount assembly 400 further includes excess sealant cavity 434 in between the pair of aft vertical support legs 414 for receiving excess sealant forcibly expelled through pressure-relief passageway 428 along the circumference of seal 430. Excess sealant cavity 434 may control the dispersion of excess sealant into a low profile, fanned out pattern that is enclosed by vertical support legs 414 which provides a visual indicator to the installer of a proper seal when excess sealant flows beyond excess sealant cavity 434. Vertical support legs 414 provide an enclosure to maintain a clean/safe work area and prevent an installer's equipment such as safety ropes and tools are kept from contacting excess sealant. Aperture 418 may be an opening extending through the forward portion which mounting fastener 438 such as a lag screw travels to penetrate the underlying support structure 20 to secure mount assembly 400 to installation surface 10.

Sealant cavity 420 is configured for receiving sealant 432 prior to mount assembly 400 being placed to installation position. As embodied herein, the production of chemical flashing could include an application or placement of sealant 432 to sealant cavity 420 using sealant gun 134 until filled. Mount assembly 400 may then be placed into position for installation so that seal 430 is placed against installation surface 10, and fastener 438 may be inserted into aperture 418. As fastener 438 penetrates underlying support structure, seal 430 is compressed, resulting in a buildup of pressurization applied to sealant 432 within sealant cavity 420 and constrained by seal 430. Pressurized sealant 436 is forced to travel into the hole formed by penetrating fastener 438. As seal 430 is compressed and pressure builds, passageway 428 closes until enough pressure is built up to where sealant can be expulsed or expelled (shown as sealant 440) because passageway 428 is weaker than other areas of seal 430. Furthermore, sealant 432 is forcibly sandwiched in between seal 430 and installation surface 10 (shown as sealant 442), filling in small voids that could be present due to an uneven, unsmooth, and/or rough texture of surface 10 as well as seal 430, thereby creating a circumferential chemical flashing about seal 330. In some embodiments, a sight hole (not used in this configuration) may provide a visual indicator of a proper seal and/or the creation of a chemical flashing if pressure-relief passageway 328 is aligned to steer the sealant in the direction of the sight hole.

It should be understood that the aspects, features and advantages made apparent from the foregoing are efficiently attained and, since certain changes may be made in the disclosed inventive embodiments without departing from the spirit and scope of the invention, it is intended that all matter contained herein shall be interpreted as illustrative and not in a limiting sense.

What is claimed is:

1. A mount assembly, comprising:
   a base with a top surface and a bottom surface;
   a pair of rails extending upwardly and approximately perpendicularly away from the top surface until reaching distal ends having opposing flanges;
   a sealant-receiving cavity extending upwardly into the base from the bottom surface;
   a compressible seal with a circumferential pressure relief passageway and disposed within a groove surrounding the sealant-receiving cavity and extending downwardly beyond the bottom surface; and
   an aperture extending through the base between the top surface and the sealant-receiving cavity.

2. The mount assembly of claim 1, wherein the sealant-receiving cavity and the compressible seal are round.

3. The mount assembly of claim 1, wherein the compressible seal is filled with sealant and configured to burst inwardly towards the center of the sealant-receiving cavity.

4. The mount assembly of claim 1, wherein the opposing flanges are configured to receive a rail employed in a solar power generation system.

5. The mount assembly of claim 1, further comprising:
   a fastener to secure the mount assembly to an installation surface, such that
      a tightening force being applied to the fastener extending through the aperture imparts a compressive force to the top surface and the compressible seal, whereby
      a portion of a sealant pre-filling the sealant-receiving cavity prior to the application of the tightening force is forced through the circumferential pressure relief passageway as the tightening force is being applied.

6. The mount assembly of claim 5, wherein the sealant is introduced through the use of a sealant gun or a blister pack.

7. The mount assembly of claim 5, wherein a second portion of the sealant is forcibly sandwiched in between the compressible seal and the installation surface as the tightening force is being applied.

8. The mount assembly of claim 1, further comprising:
   a sealant chamber extending upwardly and approximately perpendicularly away from the top surface and filled with sealant or pre-filled with sealant from at least one of a sealant gun and a blister pack; and
   a plunger configured to travel vertically within the sealant chamber, such that
      a compressive force is further imparted to the plunger, and
      the sealant is forced downwardly into the sealant-receiving cavity through one aperture.

9. The mount assembly of claim 8, wherein the sealant chamber disposed in between the pair of rails.

10. The mount assembly of claim 1, further comprising:
    an actuator;
    a cartridge receiver configured to engage the actuator and receive a sealant cartridge filled with sealant; and
    a second aperture extending between the sealant-receiving cavity and the cartridge receiver, such that a tightening force applied to the actuator after the mount assembly is secured to an installation imparts a compressive force to the sealant cartridge to introduce sealant to the sealant-receiving cavity through the second aperture, whereby
a portion of the sealant is forced through the circumferential pressure relief passageway as the sealant is introduced.

11. The mount assembly of claim 10, wherein a second portion of the sealant is forcibly sandwiched in between the compressible seal and an installation surface as the tightening force is being applied.

12. A method for producing chemical flashing in a mount assembly, comprising:
pre-filling sealant in a sealant-receiving cavity of a mount assembly comprised of:
a base with a top surface and a bottom surface,
a pair of rails extending upwardly and approximately perpendicularly away from the top surface until reaching distal ends having opposing flanges;
the sealant-receiving cavity extending upwardly into the base from the bottom surface,
a compressible seal with a circumferential pressure relief passageway and disposed within a groove surrounding the sealant-receiving cavity and extending downwardly beyond the bottom surface, and
an aperture extending through the base between the top surface and the sealant-receiving cavity;
placing the mount assembly in position on an installation surface;
inserting a fastener through the aperture and the sealant-receiving cavity; and
tightening the fastener, thereby
imparting a compressive force to the top surface and the compressible seal, whereby
a portion of the sealant is forced through the circumferential pressure relief passageway.

13. The method of claim 12, wherein the sealant-receiving cavity and the compressible seal are round.

14. The method of claim 13, wherein a second portion of the sealant is forcibly sandwiched in between the compressible seal and the installation surface as a tightening force is being applied.

15. The method of claim 12, wherein the sealant is pre-filled through the use of a sealant gun or a blister pack.

16. A method for producing chemical flashing in a mount assembly, comprising:
placing a mount assembly in position on an installation surface, the mount assembly comprised of:
a base with a top surface and a bottom surface,
a pair of rails extending upwardly and approximately perpendicularly away from the top surface until reaching distal ends having opposing flanges;
a sealant-receiving cavity extending upwardly into the base from the bottom surface,
a compressible seal with a circumferential pressure relief passageway and disposed within a groove surrounding the sealant-receiving cavity and extending downwardly beyond the bottom surface, and
an aperture extending through the base between the top surface and the sealant-receiving cavity;
inserting a fastener through the aperture and the sealant-receiving cavity; and
tightening the fastener, thereby
imparting a compressive force to the top surface and the compressible seal, whereby
sealant filling the compressible seal is released inwardly, and
a portion of the sealant is forced through the circumferential pressure relief passageway.

17. The method of claim 16, wherein the sealant-receiving cavity and the compressible seal are round.

18. The method of claim 16, wherein a second portion of the sealant is forcibly sandwiched in between the compressible seal and the installation surface as a tightening force is being applied.

19. A method for producing chemical flashing in a mount assembly, comprising:
placing a mount assembly in position on an installation surface, the mount assembly comprised of:
a base with a top surface and a bottom surface,
a pair of rails extending upwardly and approximately perpendicularly away from the top surface until reaching distal ends having opposing flanges;
a sealant-receiving cavity extending upwardly into the base from the bottom surface,
a compressible seal with a circumferential pressure relief passageway and disposed within a groove surrounding the sealant-receiving cavity and extending downwardly beyond the bottom surface,
an aperture extending through the base between the top surface and the sealant-receiving cavity; and
a plunger configured to travel vertically within the sealant chamber, and
injecting sealant into the sealant chamber;
inserting a fastener through the aperture and the sealant-receiving cavity; and
tightening the fastener, thereby
imparting a compressive force to the plunger, whereby sealant is forced downwardly through the aperture and into the sealant-receiving cavity,
the compressive force is further imparted to the compressible seal, and
a portion of the sealant is forced through the circumferential pressure relief passageway.

20. The method of claim 19, wherein the sealant is injected into the sealant chamber with a sealant gun.

21. The method of claim 19, wherein a second portion of the sealant is forcibly sandwiched in between the compressible seal and the installation surface as a tightening force is being applied.

22. A method for producing chemical flashing in a mount assembly, comprising:
placing a mount assembly in position on an installation surface, the mount assembly comprised of:
a base with a top surface and a bottom surface,
a pair of rails extending upwardly and approximately perpendicularly away from the top surface until reaching distal ends having opposing flanges;
a sealant-receiving cavity extending upwardly into the base from the bottom surface,
a compressible seal with a circumferential pressure relief passageway and disposed within a groove surrounding the sealant-receiving cavity and extending downwardly beyond the bottom surface,
a first aperture extending through the base between the top surface and the sealant-receiving cavity,
an actuator;
a cartridge receiver configured to receive the actuator and a sealant cartridge filled with sealant; and
a second aperture extending between the cartridge receiver and the sealant-receiving cavity;

inserting a fastener through the actuator and the sealant-receiving cavity;

tightening the fastener until the mount assembly is secured to the installation surface; and tightening the actuator, whereby the sealant is forced into the sealant-receiving cavity.

23. The method of claim 22, wherein a portion of the sealant is forced through the circumferential pressure relief passageway.

24. The method of claim 22, wherein a second portion of the sealant is forcibly sandwiched in between the compressible seal and the installation surface as a tightening force is being applied.

* * * * *